US012682700B2

(12) United States Patent
Lee

(10) Patent No.: US 12,682,700 B2
(45) Date of Patent: Jul. 14, 2026

(54) VEHICLE CONDITION DIAGNOSIS CONTROL SYSTEM AND METHOD

(71) Applicant: HL Mando Corporation, Pyeongtaek-si (KR)

(72) Inventor: Jeong Woo Lee, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 256 days.

(21) Appl. No.: 18/435,122

(22) Filed: Feb. 7, 2024

(65) Prior Publication Data

US 2024/0290144 A1 Aug. 29, 2024

(30) Foreign Application Priority Data

Feb. 23, 2023 (KR) ........................ 10-2023-0024630

(51) Int. Cl.
*G07C 5/08* (2006.01)

(52) U.S. Cl.
CPC .................................. *G07C 5/0808* (2013.01)

(58) Field of Classification Search
CPC ........ G07C 5/0808; G06N 3/08; G06N 20/00; B60W 50/045; B60R 16/0232; B60T 17/22
See application file for complete search history.

(56) References Cited

U.S. PATENT DOCUMENTS 10,486,675 B2 11/2019 Hearing et al.
11,720,862 B2 * 8/2023 Dagley ............. G06Q 30/0206 705/7.33
12,469,336 B2 * 11/2025 Bunazawa ............. G07C 5/008
12,488,641 B1 * 12/2025 Herron ................... G07C 5/008
2020/0285970 A1 * 9/2020 Dagley .................. G06Q 10/20
2021/0312725 A1 * 10/2021 Milton ................... G06N 3/098
2022/0058891 A1 * 2/2022 Ha ........................... G07C 5/12
2023/0204461 A1 * 6/2023 Schneider ............. G01M 15/02 701/111
2023/0351174 A1 * 11/2023 Lee ...................... G06N 3/0464
2023/0406330 A1 * 12/2023 Woodbury .......... B60W 50/045
2024/0217500 A1 * 7/2024 Cha ....................... B60T 17/221
2025/0010839 A1 * 1/2025 Dijken ...................... B60T 8/96

FOREIGN PATENT DOCUMENTS

KR 10-22239040 B1 4/2021
KR 10-2021-0073357 A 6/2021
KR 10-2263337 B1 6/2021
KR 10-2022-0025655 A 3/2022

OTHER PUBLICATIONS

Office Action issued on Jul. 19, 2024 for corresponding Korean Patent Application No. 10-2023-0024630 along with an English translation (9 pages).

* cited by examiner

*Primary Examiner* — Anne Marie Antonucci
*Assistant Examiner* — Patrick Daniel Mohl
(74) *Attorney, Agent, or Firm* — Hauptman Ham, LLP

(57) ABSTRACT

A VHM device according to embodiments of the present disclosure relates to a vehicle condition diagnosis control system and, more particularly, to a vehicle condition diagnosis control system and method which assess and deal with the condition of each component of a vehicle and, at the same time, accurately predict the replacement cycle of each consumable in such a way as to suit each vehicle or the driving pattern of each driver and provide the user periodic feedback about the overall condition of the vehicle.

14 Claims, 9 Drawing Sheets

VEHICLE CONDITION DIAGNOSIS CONTROL SYSTEM AND METHOD

CROSS-REFERENCE TO RELATED APPLICATION

The present application claims the benefit of priority to Korean Patent Application No. 10-2023-0024630 filed on Feb. 23, 2023 in the Korean Intellectual Property Office. The aforementioned applications are hereby incorporated by reference in their entireties.

TECHNICAL FIELD

The present disclosure relates to a vehicle condition diagnosis control system and, more particularly, to a vehicle condition diagnosis control system and method which assess and deal with the condition of each component of a vehicle and, at the same time, accurately predict the replacement cycle of each consumable in such a way as to suit each vehicle or the driving pattern of each driver and provide the user periodic feedback about the overall condition of the vehicle.

BACKGROUND

In a car there are a variety of components including consumables and a device or system implemented by a number of components. For the management of a vehicle in which such components and such a device or system need to be run in a complex and organic way, a mechanic in an automobile repair shop has to check the condition of every component in the car, which makes vehicle management time-consuming and also leads to an increase in maintenance and operation costs.

Conventional vehicle management technologies include, for example, the technology of showing through a dashboard or the like within the vehicle whether or not the engine is malfunctioning by detecting the remaining amount of fuel or the temperature of the engine or the technology of indicating whether an airbag works properly.

However, other than the above-mentioned devices, there are limitations in terms of cost and difficulty of implementation when it comes to functions like accurately checking and indicating the remaining lifetime of components or consumables such as a brake pad, checking the amount of wear on a tire and indicating when to replace it, and checking and indicating remaining battery level.

In diagnosing the condition of a brake pad, for example, a conventional damage accumulation-based pad wear diagnosis algorithm requires continuous monitoring of real-time vehicle data, and also requires continuous summation of various feature data over time to calculate wear rate. This is a lot of data to process, so it takes a considerable amount of computation and also a considerable amount of time to process it in real time through an embedded system in the vehicle.

Meanwhile, conventional technologies suggest a cloud computing-based automotive diagnostic system in order to solve inconveniences like the insufficient computational power of embedded systems in vehicles, the high costs of detectors, or in-vehicle mounting issues. However, processing such data simply through a wireless communication-based solution such as cloud can cause data transmission loss, which makes it difficult to perform real-time diagnosis. On the other hand, processing such data by an in-vehicle system alone may often lead to a decrease in the accuracy of a diagnosis model due to various factors (weather, road condition, vehicle behavior, etc.)

SUMMARY

An exemplary embodiment of the present disclosure provides a vehicle health monitoring (VHM) device including: an interface unit which collects a plurality of pieces of raw data sensed from a data collection unit in the vehicle and performs data transmission and reception to and from electric control units (ECUs) or a domain control unit (DCU); a data selection unit which selects sensing data required to diagnose the condition of a particular device or particular component of the vehicle from among the collected raw data; a feature data generation unit which generates at least one piece of feature data from the selected sensing data through feature extraction; a condition feature data derivation unit which derives condition feature data for the particular device or particular component by inputting the selected sensing data and the at least one piece of generated feature data into a machine learning-based condition diagnosis model; and a control signal generation unit which generates a control signal for the particular device or particular component based on the condition feature data.

In certain embodiments, the VHM device may further include a condition diagnosis model training unit which constructs the condition diagnosis model by performing machine learning of a learning data set including at least either the selected sensing data, the at least one piece of generated feature data, or the feature characteristic data.

In certain embodiments, the condition feature data derivation unit may derive the condition feature data based on sensing data weights assigned to respective pieces of the sensing data and feature data weights assigned to the at least one piece of feature data, wherein the feature data weights may have a higher weight value than the sensing data weights.

In certain embodiments, the VHM device may further include a feature data management unit which configures a condition feature data set by hierarchically structuring the condition feature data for each of a plurality of devices or components including the particular device or component.

In certain embodiments, the condition feature data set may include: a first condition feature layer including the vehicle's chassis condition feature data, power condition feature data, and ADAS (advanced driver assistance systems) condition feature data; a second condition feature layer including braking condition feature data, steering condition feature data, and suspension condition feature data, which is configured as lower-level data of the chassis condition feature data; and a third condition feature layer including brake pad condition feature data, which is configured as lower-level data of the braking condition feature data.

In certain embodiments, the first condition feature data contained in the first condition feature layer may be derived by additionally learning at least one piece of such data as the second condition feature data contained in the second condition feature layer and the third condition feature data contained in the third condition feature layer, and the second condition feature data may be derived by additionally learning at least one piece of such data as the third condition feature data.

In certain embodiments, if the particular device or component is a brake pad, the selected sensing data may include brake pedal stroke data, vehicle deceleration data, master cylinder pressure data, tire pressure data, and weather data, the feature data may include brake pedal stroke-deceleration ratio data, and the condition feature data may include brake pad wear condition feature data, wherein the condition feature data derivation unit may derive the brake pad wear condition feature data by assigning the highest weight value to the brake pedal stroke-deceleration ratio feature data based on road friction coefficient data estimated from the weather data.

In certain embodiments, the control signal generation unit may adjust the gain of a braking force generated in response to the brake pedal stroke data based on the brake pad wear condition feature data.

In certain embodiments, the control signal generation unit may adjust the timing for issuing a collision warning or the timing for entering an emergency braking mode based on the brake pad wear condition feature data.

Another exemplary embodiment of the present disclosure provides a vehicle condition diagnosis control system including: a health monitoring (VHM) device embedded in a vehicle, for managing condition feature data for each device or each component by diagnosing the conditions of individual devices or components of the vehicle; a data collection unit which collects sensing data from the devices or components and transmits the same to the VHM device; and a VHM cloud which cumulatively collects the sensing data and the condition feature data for each device or each component by performing periodical or non-periodical communication with the VHM device.

In certain embodiments, the VHM cloud may include: a life prediction unit which derives life prediction data for each of the devices and components of the vehicle by inputting the cumulatively collected sensing data and the condition feature data for each device or component into a deep learning-based life prediction model; and a complex condition feature data generation unit which generates the vehicle's composite condition feature data dependent upon the conditions of two or more devices or components by inputting the sensing data and the condition feature data for each device or component into a deep learning-based complex condition diagnosis model.

In certain embodiments, the VHM device may include: a data selection unit which selects sensing data required to generate condition feature data for each device or component from among the collected sensing data; a feature data generation unit which generates at least one piece of feature data from the selected sensing data through feature extraction; a condition feature data derivation unit which derives condition feature data for each device or component by inputting the selected sensing data and the at least one piece of generated feature data into a machine learning-based condition diagnosis model; and a control signal generation unit which generates a control signal for each device or component based on the condition feature data for each device or component.

In certain embodiments, the condition feature data derivation unit of the VHM device may derive condition feature data for each device or component by inputting instantaneous values of the sensing data and instantaneous values of the at least one piece of feature data into the condition diagnosis model, wherein the life prediction unit and complex condition feature data generation unit of the VHM cloud may derive the life prediction data and the complex condition feature data by inputting the sensing data accumulated in time series and the condition feature data for each device or component accumulated in time series into the life prediction model and the complex condition diagnosis model.

In certain embodiments, if the condition feature data for each device or component is out of a reference range, the VHM device may periodically or non-periodically send the sensing data, the at least one piece of feature data, and the condition feature data for each device or component to the VHM cloud, and the VHM cloud may generate a learning guidance data for training the condition diagnosis model through guidance based on the collected sensing data, the at least one piece of feature data, or the condition feature data for each device or component and then send the same to the VHM device.

In certain embodiments, the VHM cloud may generate a vehicle management report based on the life prediction data and the complex condition feature data and then send the same to the VHM device.

According to embodiments of the present disclosure, a proper proactive measure such as regulating control functions can be taken by accurately diagnosing the condition of a vehicle through assessment of the conditions of components and the overall performance of the vehicle.

Furthermore, the condition of each component or device in a vehicle can be efficiently diagnosed, thus sparing the driver the trouble of having to remember when to replace each automotive consumable, and it is also possible to reduce the money and time it takes to get a mechanic to check the conditions of components, thereby minimizing waste of resources and costs which are incurred when components are replaced too frequently. Moreover, replacing consumables at the right timing allows for optimal management of the condition of the vehicle, which can reduce the risk of car accidents and increase the lifespan of the car.

Furthermore, according to embodiments of the present disclosure, it is possible to provide information required to take measures for optimizing vehicle performance by predicting the lifetime of components or analyzing factors causing a performance decline, going beyond the capabilities of conventional controllers to diagnose failures.

The effects of the present disclosure are not limited to the foregoing, and other effects not mentioned herein will be able to be clearly understood by those skilled in the art from the following description.

DETAILED DESCRIPTION

Figure 1:
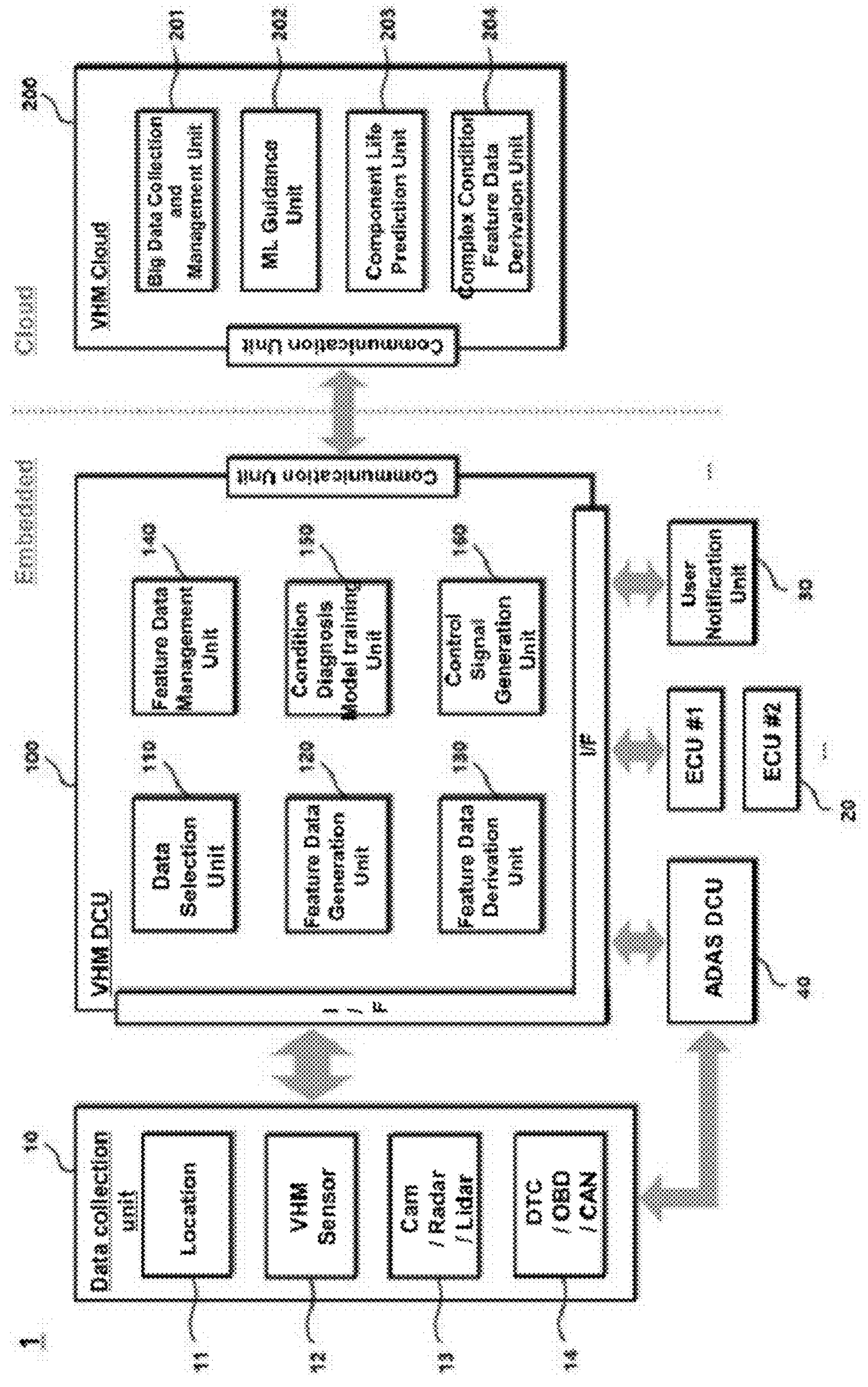
FIG. 1 is a schematic diagram for explaining a vehicle condition diagnosis control system according to certain embodiments of the present disclosure.

Advantages and features of the present disclosure and methods for achieving them will be made clear from the embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the present disclosure to those skilled in the art. The present disclosure is merely defined by the scope of the claims.

When reference numerals refer to components of each drawing, it is to be noted that although like components are illustrated in different drawings, like components are denoted by the same reference numerals as possible. In the following description, a detailed explanation of related known configurations or functions may be omitted to avoid obscuring the subject matter of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined. It is also to be understood that the terminology used in this specification is for the purpose of describing embodiments only and is not intended to limit the present disclosure. In this specification, singular forms include even plural forms unless the context indicates otherwise.

In addition, in describing the components of the embodiments of the present disclosure, terms such as first, second, A, B, (a), (b), and the like may be used. These terms are only intended to distinguish the components from other components, and the nature, sequence, or order of the components is not limited by the terms. When a component is described as being "connected", "coupled", or "linked" to other components, it should be understood that the component may be directly connected or linked to the other component, but another component may be "connected", "coupled", or "linked" between the respective components.

The terms "comprises" and/or "comprising" used in the specification for stated component, step, operation, and/or element do not preclude the presence or addition of one or more other components, steps, operations, and/or elements.

The term "vehicle" mentioned in this specification may be defined as a transportation means that travels on a road or a rail. That is, the vehicle may be a concept that includes an automobile, a train, and a motorcycle. Moreover, the vehicle may be a concept that includes an internal combustion vehicle equipped with an engine as a power source, a hybrid vehicle which uses an engine and an electric motor as a power source, and an electric vehicle equipped with an electric motor as a power source. Furthermore, the vehicle may be a privately-owned vehicle or a public vehicle.

Hereinafter, various embodiments of the present disclosure will be described in detail with reference to the accompanying drawings.

Figure 2:
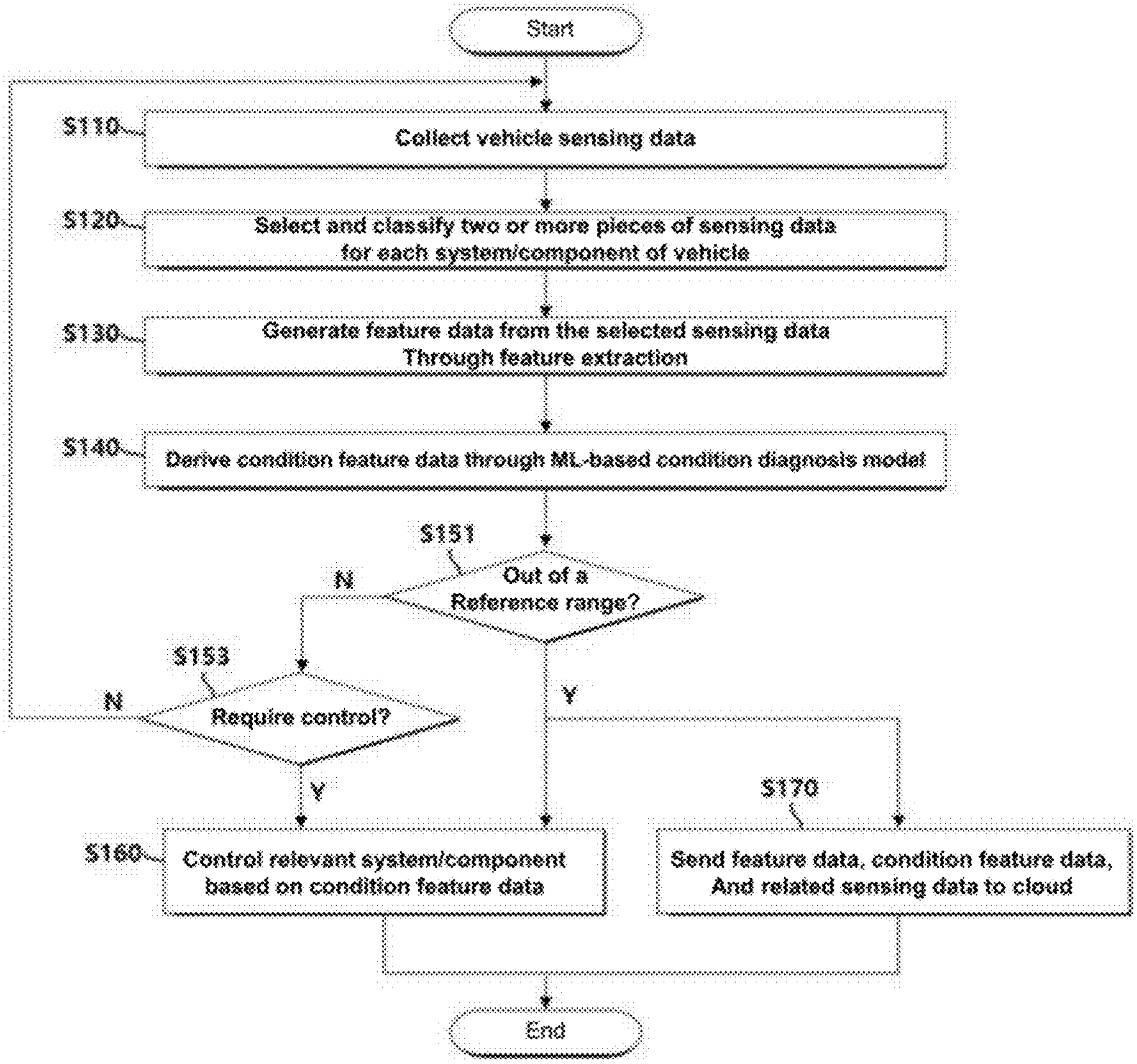
FIG. 2 is a flowchart for explaining a process in which a VHM DCU of a vehicle condition diagnosis control system diagnoses and controls the condition of a vehicle, according to certain embodiments of the present disclosure.
Figure 3:
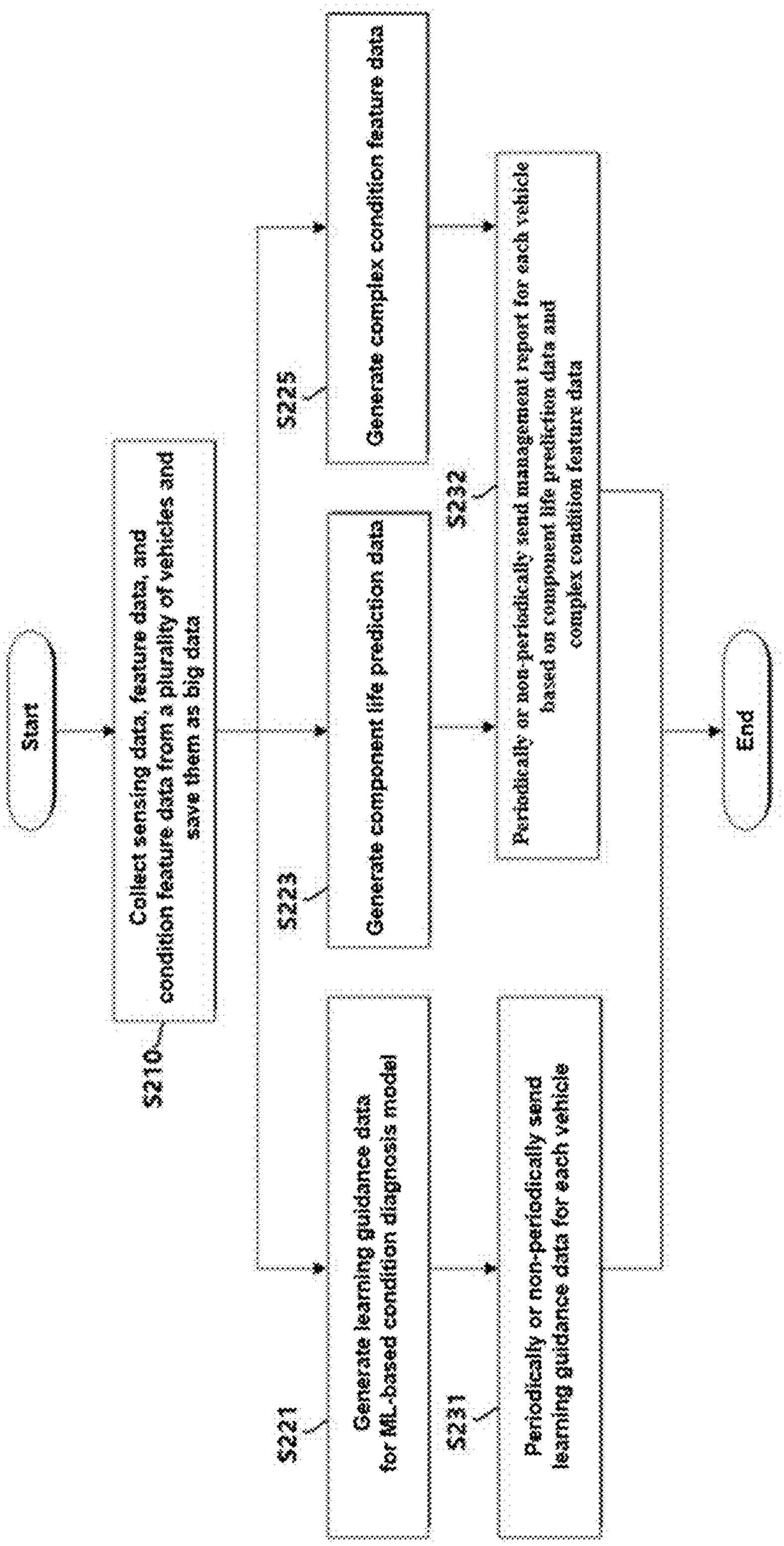
FIG. 3 is a flowchart for explaining a process in which a VHM cloud of a vehicle condition diagnosis control system diagnoses the condition of a vehicle, according to certain embodiments of the present disclosure.

FIG. 1 is a schematic diagram for explaining a vehicle condition diagnosis control system according to certain embodiments of the present disclosure. FIG. 2 is a flowchart for explaining a process in which a VHM DCU of a vehicle condition diagnosis control system diagnoses and controls the condition of a vehicle, according to certain embodiments of the present disclosure. FIG. 3 is a flowchart for explaining a process in which a VHM cloud of a vehicle condition diagnosis control system diagnoses the condition of a vehicle, according to certain embodiments of the present disclosure.

Referring to FIGS. 1 to 3, the vehicle condition diagnosis control system 1 may include a vehicle health monitoring (VHM) device 100 installed inside a vehicle, and a VHM cloud 200 implemented by a management server (not shown) external to the vehicle.

Furthermore, the vehicle condition diagnosis control system 1 may additionally include a data collection unit 10 connected to the VHM device 100, for collecting various data on the vehicle, at least one electric control units (ECUs) 20, a user notification unit 30, and an advanced driver assistance systems domain control unit (ADAS DCU) 40.

The data collection unit 10 may collect sensing data from the above devices or components and transmit it to the VHM device 100 (S110). For example, the data collection unit 10 may include a position sensor 11, a VHM sensor 12, and object sensors 13.

The position sensor 11 may include a global positioning system (GPS), a differential global positioning system (DGPS), a global navigation satellite system (GNSS), and so on. Further, the position sensor 11 as used herein may be a concept that includes an inertial sensor such as an inertial measurement unit (IMU). Also, the position sensor 11 may generate corrected data from a signal generated by a GPS or the like, based on an IMU signal.

The VHM sensor 12 may include a temperature sensor, a humidity sensor, a noise sensor, etc. which are internal or external to the vehicle.

The object sensors 13 may include at least one of a camera, a radar, a LiDAR, an ultrasonic sensor, and an ultraviolet sensor. Further, the object sensors 13 may generate information on the weather condition outside the vehicle, information as to whether there is an object outside the vehicle, the location of the object, the distance between the vehicle and the object, and the speed of the vehicle relative to the object, and so on from information collected by the camera, the radar, the LiDAR, etc.

Meanwhile, the data the data collection unit 10 of the present disclosure provides to the VHM device 100 may include, apart from the data from the sensors, controller area network (CAN) data, on-board diagnostics (OBD) data, or diagnostic trouble code (DTC) data, which are sensed from each individual component of the vehicle and put together.

Such data may include data collected from various types of sensors—for example, a collision sensor, a speed sensor, an inclination sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, a wheel speed sensor, a steering angle sensor, a passenger sensor, a yaw rate sensor, a transverse acceleration sensor, a brake pressure sensor, a brake oil temperature sensor, an engine oil temperature sensor, and a cooling water temperature sensor.

It should be noted that the sensors listed above are exemplary only, and that they may include various forms of sensors for sensing a variety of conditions of the vehicle and data generated during vehicle driving.

Furthermore, the data the data collection unit 10 provides to the VHM device 10 may include data collected or calculated from the VHM cloud 200 to be described later and data collected and transmitted from a telemetric system.

The at least one ECU 20 may refer to an electronic control unit that performs an independent function, such as an engine control unit (ECU), a transmission control unit (TCU), a brake control unit (BCU), an airbag control unit (ACU), etc. which is physically or logically distinguished and controls components of the vehicle.

The user notification unit 30 may be an interface device for communication from the vehicle to the user. For example, the user notification unit 30 may be implemented through a dashboard or a display device such as a dashboard display or a head-up display (HUD), or may be implemented through a car audio system.

The ADAS DCU 40 may be a main integrated control system which controls an advanced driver assistance system. The advanced driver assistance system may be configured to sense what is going on in front of the vehicle, assess the situation based on sensing results, and control the behavior of the vehicle based on the assessment. For example, the ADAS may implement an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, an adaptive high beam assist (HBA) system, an auto parking system (APS), a PD collision warning system, a traffic sign recognition (TSR) system, a traffic sign assist (TSA) system, a night vision (NV) system, a driver status monitoring (DSM) system, and a traffic jam assist (TJA) system.

The VHM device 100 may be embedded in the vehicle and serve as a DCU which diagnoses the condition of each device or component of the vehicle and manages feature data for the condition of each device or component. To this end, the VHM device 100 may include an interface unit I/F, a data selection unit 110, a feature data generation unit 120, a feature data derivation unit 130, a feature data management unit 140, a condition diagnosis model training unit 150, a control signal generation unit 160, and a communication unit.

Meanwhile, the above components may refer to functional elements that are functionally distinguished from one another, and it should be noted that a plurality of components can be integrated together in an actual physical environment. That is, the above components may be implemented in different logical forms within a single processor or computing device such as ASIC (application specific integrated circuit), DSP (digital signal processor), DSPD (digital signal processing device), PLD (programmable logic device), FPGA (field programmable gate array), processor, controller, MCU (micro-controller unit), microprocessor, and so on.

The interface unit I/F may collect multiple pieces of raw data from the vehicle's data collection unit 10 and perform data transmission and reception to or from the ECU 20 or the DCU 40. The interface unit I/F may send and receive data to and from the components of the vehicle, for example, by using a communication protocol such as CAN (Controller Area Network), LIN (Local Interface Network), FlexRay, MOST (Media Oriented Systems Transport), Ethernet, etc.

The data selection unit 110 may select sensing data required to diagnose the condition of a particular device or component of the vehicle from among the raw data collected through the interface unit I/F. That is, the data selection unit 110 may select and classify two or more pieces of sensing data corresponding to a plurality of devices (or systems) or components constituting the vehicle (S120).

The feature data generation unit 120 may generate at least one piece of feature data from the selected sensing data through feature extraction (S130).

For example, the feature data generation unit 120 may generate feature data having new features by linearly or nonlinearly combining the sensing data selected through a feature extraction algorithm such as PCA (Principle Component Analysis), LDA (Linear Discriminant Analysis), CCA (Canonical Correlation Analysis), SVD (Singular Value Decomposition), ISOMAP, and LLE (Locally Linear Embedding).

The condition feature data derivation unit 130 may derive condition feature data for the particular device or component by inputting the selected sensing data and the at least one piece of generated feature data into a machine learning-based condition diagnosis model (S140).

The condition diagnosis model required for the condition feature data derivation unit 130 to derive condition feature data may be trained/constructed by the condition diagnosis model training unit 150. To this end, the condition diagnosis model training unit 140 may perform machine learning of a learning data set including at least either the selected sensing data, the at least one piece of generated feature data, or the feature characteristic data.

The feature data management unit 140 may configure a condition feature data set by hierarchically structuring the condition feature data for each of a plurality of devices or components including the particular device or component.

A more detailed description of the feature data derivation unit 130, the condition data management unit 140, and the condition diagnosis model training unit 150, which are described above, will be given with reference to FIGS. 4 to 6.

Meanwhile, the VHM device 100 may send relevant data to the VHM cloud 200 in accordance with the values of condition feature data derived from a particular device or component or generate a control signal for controlling a device/component related to the condition feature data.

For example, if condition feature data is derived as a numerical value (e.g., a remaining pad life of 55%), it is determined whether the condition feature data is out of a reference range (e.g., whether the remaining pad life drops to 60% or lower) (S151). If the condition feature data is out of a reference range, the VHM device 100 may send the condition feature data and related feature data and/or sensing data to the VHM cloud 200 (S170), and control the operation of a relevant device/component (e.g., brake system) by taking the values of the condition feature data into account.

For another example, if the condition feature data is derived as a classified value (e.g., high/moderate/low remaining pad life), whether the condition feature data is out of a reference range may be determined depending on whether or not the condition feature data corresponds to a particular classified value (e.g., "low" remaining pad life).

Meanwhile, in some embodiments, even if the condition feature data is not out of a reference range, the necessity for control may be determined (S153) to control the relevant device/component, and the control signal generation unit 160 may generate a control signal for controlling the operation of the device/component.

Communication with the VHM cloud 200 may be performed through a communication unit provided in the vehicle or the VHM device 100. Meanwhile, the VHM device 100 may exchange data with other vehicles, an infrastructure (for example, a server, a broadcasting station, etc.), a user terminal, and so on, as well as with the VHM cloud 200, through the communication unit. To this end, the communication unit may include at least one of a transmitting antenna, a receiving antenna, and an RF (radio frequency) circuit or RF element capable of implementing various communication protocols, in order to perform communication. For example, the communication unit may exchange signals with an external device via V2X (Vehicle-to-Everything), DSRC (Dedicated Short Range Communication), WAVE (Wireless Access in Vehicular Environments), etc., but not limited thereto.

The VHM cloud 200 may include a big data collection and management unit 201, a machine learning guidance unit 202, a component life prediction unit 203, and a complex condition feature data derivation unit 204. These components may be functional elements that are functionally distinguished from one another, and it should be noted that a plurality of components can be integrated together in an actual physical environment.

The big data collection and management unit 201 may cumulatively collect the above-described sensing data, feature data, and condition feature data by performing periodical or non-periodical communication with the VHM device 100. Although the present specification is described with an example in which the VHM cloud 200 communicates with one VHM device 100, the VHM cloud 200 may perform communication with VHM devices provided respectively in a plurality of vehicles, and therefore may manage data collected from each of the plurality of vehicles by saving it as big data (S210).

Based on the data that is cumulatively collected data and saved as big data, the machine learning guidance unit 202 may generate learning guidance data for training the condition diagnosis model of the VHM device 100 through guidance (S221), the component life prediction unit 203 may generate life prediction data for each device/component of the vehicle (S223), and the complex condition feature data derivation unit 204 may derive the vehicle's complex condition feature data (e.g., the vehicle's behavioral feature data, ride comfort feature data, etc.) dependent upon the conditions of two or more devices or components (S225). In a more concrete example, the complex condition feature data may include the vehicle's driving safety data (e.g., data for determining whether a slip has occurred or not) which is created by putting together data collected/calculated for each of various systems/components such as EPS (Electric Power Steering), ABS (Anti-lock Brake System), and ESC (Electronic Stability Control).

Afterwards, the VHM cloud 200 may send to each vehicle's VHM device 100 a management report for each vehicle, which is generated based on learning guidance data for each vehicle or based on component life prediction data and complex condition feature data (S231 and S232).

A more detailed description of the training of the above-described condition diagnosis model through guidance will be described with reference to FIG. 4, and the derivation of component life prediction data and complex condition feature data will be described in more detail with reference to FIG. 7.

Figure 4:
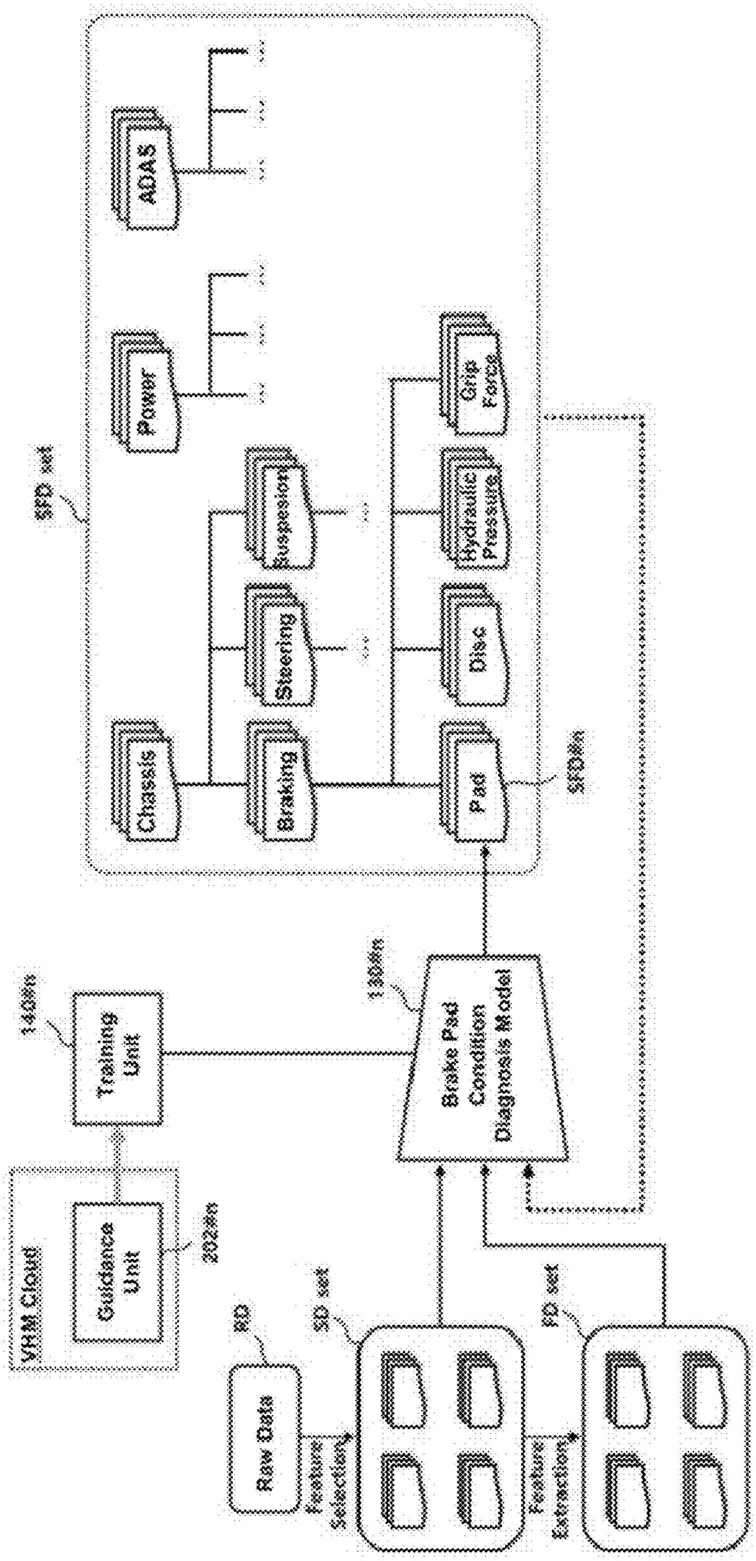
FIGS. 4 and 5 are views for illustrating a method of constructing condition feature data according to certain embodiments of the present disclosure.
Figure 5:
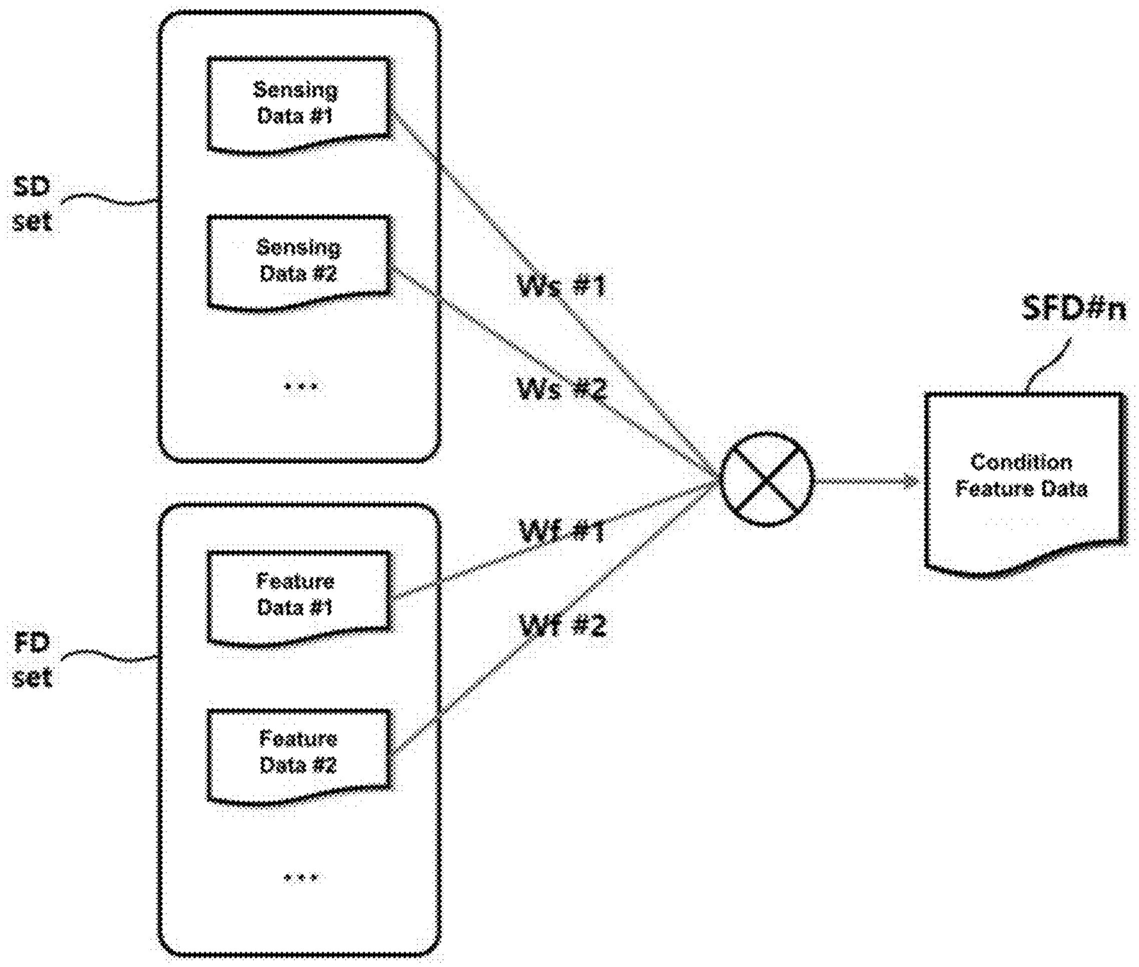
Figure 6:
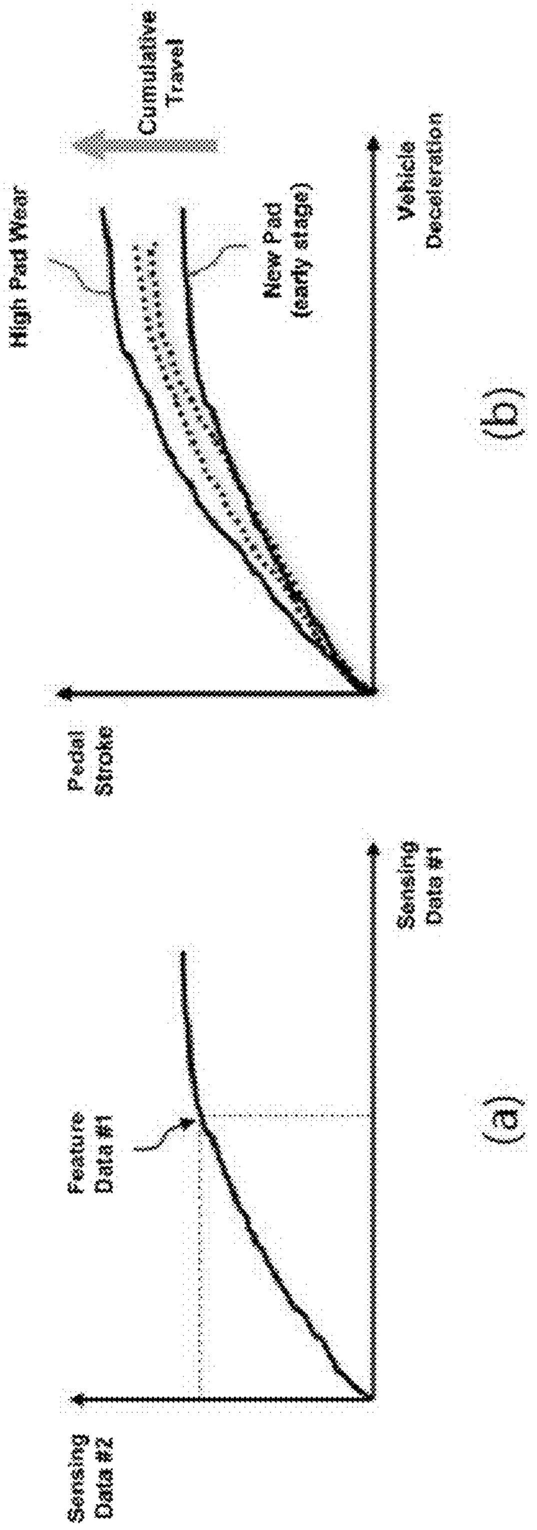
FIG. 6 is a view for illustrating a method of generating feature data according to certain embodiments of the present disclosure.

FIGS. 4 and 5 are views for illustrating a method of constructing condition feature data according to certain embodiments of the present disclosure. FIG. 6 is a view for illustrating a method of generating feature data according to certain embodiments of the present disclosure.

Although FIG. 4 only depicts a single condition diagnosis model, a plurality of condition diagnosis models may be constructed in order to derive each piece of condition feature data within a condition feature data set. Hereinafter, a brake pad condition diagnosis model 130 #n for deriving brake pad condition feature data SFD #n from among condition feature data within a condition feature data set (SFD set) will be described as an example.

Referring to FIG. 4, for diagnosis of the condition of each device/component, the VHM device 100 may derive condition feature data SFD #n for a particular device/component by selecting sensing data (SD set) required to diagnose the condition of a particular device/component from among collected raw data RD, generating at least one piece of feature data (FD set) through feature extraction, and inputting the sensing data (SD set) and the feature data (FD set) into a machine learning-based condition diagnosis model 130 #n, as described with reference to FIG. 1.

Specifically, the condition feature data SFD #n may be derived based on sensing data weights Ws #1 and Ws #2 assigned to respective pieces of the sensing data and feature data weights Wf #1 and Wf #2 assigned to respective pieces of the feature data, as depicted in FIG. 5.

Preferably, the feature data weights Wf #1 and Wf #2 may have a higher weight value than the sensing data weights Ws #1 and Ws #2. Furthermore, the sensing data weights Ws #1 and Ws #2 may be 0 in order to maximize the processing rate at which the condition feature data is derived. That is, only either a single piece of feature data or a plurality of pieces of feature data may be used to drive the condition feature data SFD #n.

In a concrete example, for diagnosis of the condition of a brake pad, brake pedal stroke data, vehicle deceleration data, master cylinder pressure data, tire pressure data, and weather data may be selected as the sensing data (SD set). As depicted in FIG. 6, brake pedal stroke-deceleration ratio data may be generated as the feature data (FD set). Here, the weather data may be information acquired through the communication unit, or the weather condition and the road condition may be identified by using the vehicle's camera, radar, etc.

Moreover, the brake pad-related feature data (FD set) may additionally include road friction condition data, brake pedal stroke-master cylinder pressure ratio data, and master cylinder pressure-deceleration ratio data, which are selected or calculated from weather data (e.g., temperature/humidity, whether the road is covered with snow or wet with rain, and so on).

The brake pad condition diagnosis model 130 #n may derive brake pad condition feature data SFD #n by receiving the brake pad-related sensing data (SD set) and the brake pad-related feature data (FD set). As described above, weights may be assigned to the brake pad-related sensing data (SD set) and the brake pad-related feature data (FD set). Preferably, the highest weight value may be assigned to the brake pedal stroke-deceleration ratio data.

Meanwhile, the condition feature data suggested in the present disclosure may have a hierarchical structure. For example, condition feature data may be hierarchically structured into first to third condition feature layers, as depicted in FIG. 4. The first condition feature layer may include condition feature data which classifies various functions of the vehicle into large categories, the second condition feature layer may include some of the condition feature data contained in the first condition feature layer, that is configured as at least one lower-level layer, and, likewise, the third condition feature layer may include some of the condition feature data contained in the second condition feature layer, that is configured as at least one lower-level layer.

For example, the first condition feature layer may include the vehicle's chassis condition feature data, power condition feature data, and ADAS (advanced driver assistance systems) condition feature data, the second condition feature layer may include such condition feature data as braking condition feature data, steering condition feature data, and suspension condition feature data, which is configured as lower-level data of the chassis condition feature data, and the third condition feature layer may include such condition feature data as brake pad condition feature data and disc condition feature data, which is configured as lower-level data of the braking condition feature data, but it should be noted that these condition feature layers are not limited to the above.

Meanwhile, each condition diagnosis model 130 #n may be trained/constructed by a condition diagnosis model training unit 140 #n. To this end, the condition diagnosis model training unit 140 #n may perform machine-learning of a learning data set including at least either selected sensing data (SD set), at least one piece of feature data (FD set), or condition feature data SFD #n.

In some embodiments, when deriving particular condition feature data, different condition feature data may be contained in a learning data set for the condition diagnosis model, in order to derive each piece of condition feature data hierarchically structured within a condition feature data set (SFD set) efficiently and with high reliability. For example, the first condition feature data (e.g., chassis condition feature data) contained in the first condition feature layer may be derived by additionally learning at least one piece of such data as the second condition feature data (e.g., braking condition feature data) contained in the second condition feature layer and the third condition feature data (e.g., brake pad condition feature data) contained in the third condition feature layer. Similarly, the second condition feature data (e.g., braking condition feature data) may be derived by additionally learning at least one piece of such data as the third condition feature data (e.g., brake pad condition feature data).

Meanwhile, the condition diagnosis model training model 140 #n may train the condition diagnosis model 130 #n through a guidance or non-guidance training algorithm, or may train the condition diagnosis model 130 #n through both a guidance training algorithm and a non-guidance training algorithm. For example, at least one training algorithm such as K-NN (K-Nearest Neighbor), SVM (Support Vector Machine), Decision Tree, Random Forest, Naive Bayer Classifier, K-means clustering, Linear Regression, Logistic Regression, Clustering, Dimensionality Reduction, and Association Rule Learning may be used to train the condition diagnosis model 130 #n.

In some embodiments, learning guidance data for guidance learning may include actual data selected by the administrator. For example, sensing data and feature data for a high pad wear rate (e.g., a remaining pad life of 10% or lower) may be used as learning guidance data for diagnosing the condition of a brake pad.

In other embodiments, the learning guidance data for guidance learning may include first learning guidance data consisting of actual data selected by the administrator and second learning guidance data which is generated based on data that is cumulatively collected from a plurality of vehicles and saved as big data in the VHM cloud 200.

In this case, the VHM device 100 may construct a diagnosis model by learning the first learning guidance data with a first learning weight and learning the second learning guidance data with a second learning weight. In some cases, condition feature data generated based on big data may have somewhat different features for different vehicles. In this case, learning the second learning guidance data with the same learning weight may lead to a degradation of the performance of the diagnosis model.

For another example, the VHM cloud 200 may determine the learning weight for the second learning guidance data based on a confidence score from a similarity checker which checks similarity in condition between vehicles based on each vehicle's driving history, driving environment, driving habits, etc., and guide the VHM device 100 to perform machine learning according to the determined learning weight. The confidence score refers to the probability that the second learning guidance data provided to the vehicle may be similar to the condition of the vehicle. It can be assumed that, the higher similarity the learning guidance data has, the higher the learning weight assigned to the data. According to this embodiment, the performance of the diagnosis model can be improved through more intense learning of learning data based on actual data from the vehicle and learning data with high similarity to the vehicle.

In the above embodiments, the term "learning weight" refers to a value indicating how much data is reflected in training a particular model (i.e., updating the weight parameter of the model), and a concrete method of applying a learning weight may vary depending on the embodiment. For example, when updating the weight parameter of the model through backpropagation, a learning weight may be reflected in training the model by increasing or decreasing the error (e.g., the difference between target and model prediction) propagated backwards based on the learning weight. For instance, when learning data with a high learning weight value, the data may be learned intensely by increasing (amplifying) the backwards-propagated error. For another example, the learning weight may be reflected in training the model by increasing or decreasing the number of times of learning based on the learning weight. For instance, for data with a high learning weight value, the data may be learned intensely by increasing the number of times of learning.

Meanwhile, in the vehicle condition diagnosis control system according to the present disclosure, the VHM device performs vehicle condition diagnosis based on machine learning, and the VHM cloud diagnoses the complex conditions of the vehicle based on big data and deep learning, thereby assessing and dealing with degradation in the performance of the vehicle/component in real time and, at the same time, accurately predicting the replacement cycle of each consumable in such a way as to suit each vehicle and providing the user periodic feedback about the overall condition of the vehicle.

Figure 7:
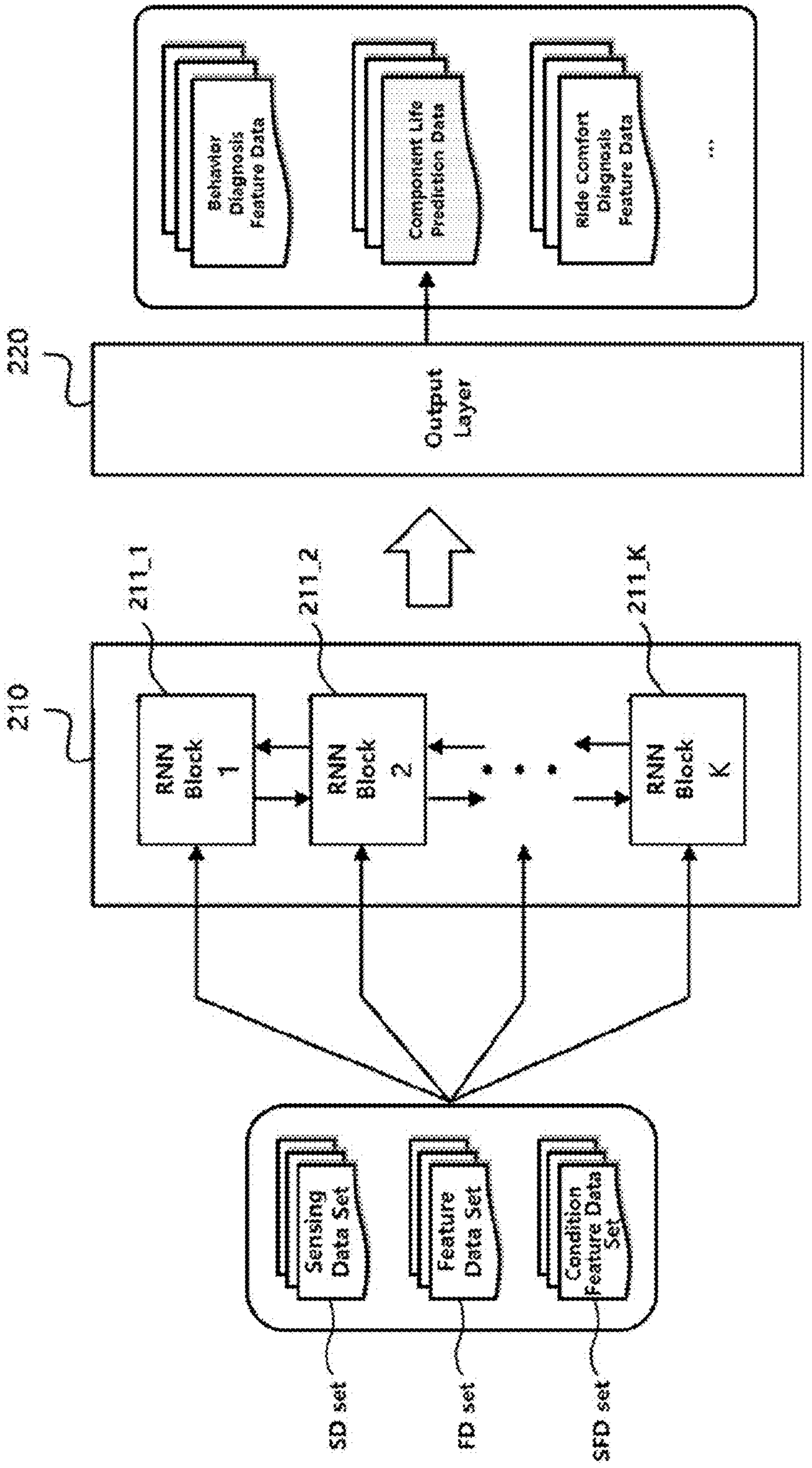
FIG. 7 is a view for illustrating a method in which the VHM cloud of the vehicle condition diagnosis control system performs deep learning-based vehicle condition diagnosis according to certain embodiments of the present disclosure.

FIG. 7 is a view for illustrating a method in which the VHM cloud of the vehicle condition diagnosis control system performs deep learning-based vehicle condition diagnosis according to certain embodiments of the present disclosure.

As depicted in FIG. 7, the VHM cloud 200 may perform in-depth diagnosis of the vehicle's condition by using a recurrent neural network-based in-depth diagnosis model. However, the in-depth diagnosis model is not limited to this, and may be implemented as various types of neural networks such as ANN (Artificial Neural Network), CNN (Convolutional Neural Network), DNN (Deep Neural Network), Deep Q-Network, or a combination thereof.

Meanwhile, the term "in-depth analysis" may refer to predicting the lifetime of each component in consideration of the driving characteristics of the vehicle or diagnosing the complex conditions of the vehicle such as the vehicle's behavioral features and ride comfort features which cannot be known by the conditions of individual components alone, as opposed to merely diagnosing the conditions of components based on machine learning for the sake of efficient operation of an embedded device. To provide a better understanding, the structure and operating principle of a vehicle diagnosis model will be described first, and then a training and diagnosis method for the vehicle diagnosis model will be described.

As depicted in FIG. 7, an in-depth vehicle diagnosis model according to the present disclosure may include an analysis neural network 210 for analyzing input data and an output layer 220 for outputting prediction results about the occurrence of an abnormal situation.

The analysis neural network 210 may receive data consisting of a plurality of consecutive (or time-series) data values (i.e., a sequence of data values) and analyze the data in consideration of time-series characteristics of the data values.

The analysis neural network 210 may perform accurate analysis according to the order of input data values by means of a plurality of RNN blocks 211_1 to 211_K. Here, the plurality of data values may include at least one or all of sensing data (SD set), feature data (FD set), and condition feature data (SFD set), as illustrated in the drawing.

The output layer 220 may output prediction results about the occurrence of an abnormal situation based on analysis results from the analysis neural network 210. That is, the output layer 220 may receive analysis results from the analysis neural network 210 and predict the condition of the vehicle by making an in-depth diagnosis through neural network calculations. The output layer 220 may be implemented based on a fully-connected layer, for example, but the scope of the disclosure is not limited to this.

The in-depth vehicle diagnosis model illustrated in FIG. 7 may be trained by using data and label information about the occurrence of an abnormal situation (e.g., there is something wrong with behavior or ride comfort). The training may be performed by the VHM cloud 200 or by a separate training device/system. A description of the learning method will be omitted since a person skilled in the art is presumed to have knowledge of the method of training a deep learning model (i.e., updating the weight parameter of the model) through backpropagation of prediction error (i.e., difference between prediction and label information).

Once the training is completed, the VHM cloud 200 may perform monitoring by using a trained in-depth vehicle diagnosis model. For instance, the VHM cloud 200 may perform in-depth vehicle diagnosis by acquiring data based on a saved look-up table and inputting the acquired data into the in-depth vehicle diagnosis model.

Meanwhile, the in-depth vehicle diagnosis model may be configured to include a plurality of analysis neural networks. For instance, the in-depth vehicle diagnosis model may include a first analysis neural network for analyzing the predicted life of each component, a second analysis neural network for analyzing the vehicle's behavioral features or whether there is something wrong with the behavior of the vehicle, and an output layer for deriving a management report for each vehicle by giving comprehensive consideration into analysis results from the first and second analysis neural networks. In this case, the in-depth vehicle diagnosis model performs in-depth vehicle diagnosis by giving comprehensive consideration into data associated with different frames, thereby enabling more precise vehicle condition monitoring for each vehicle and driver.

Meanwhile, once the VHM device 100 and/or the VHM cloud 200 completes the diagnosis of the condition of a vehicle or component, the VHM device 100 may generate and output a control signal for correcting a control value for the vehicle's behavior or a control value for a particular system based on results of the condition diagnosis.

This will be described by taking a brake pad as an example. The VHM device 100 may derive condition feature data (e.g., remaining pad life) for the brake pad and then control the operation of the brake system so that the vehicle's braking characteristics are altered based on the derived remaining pad life.

Figure 8:
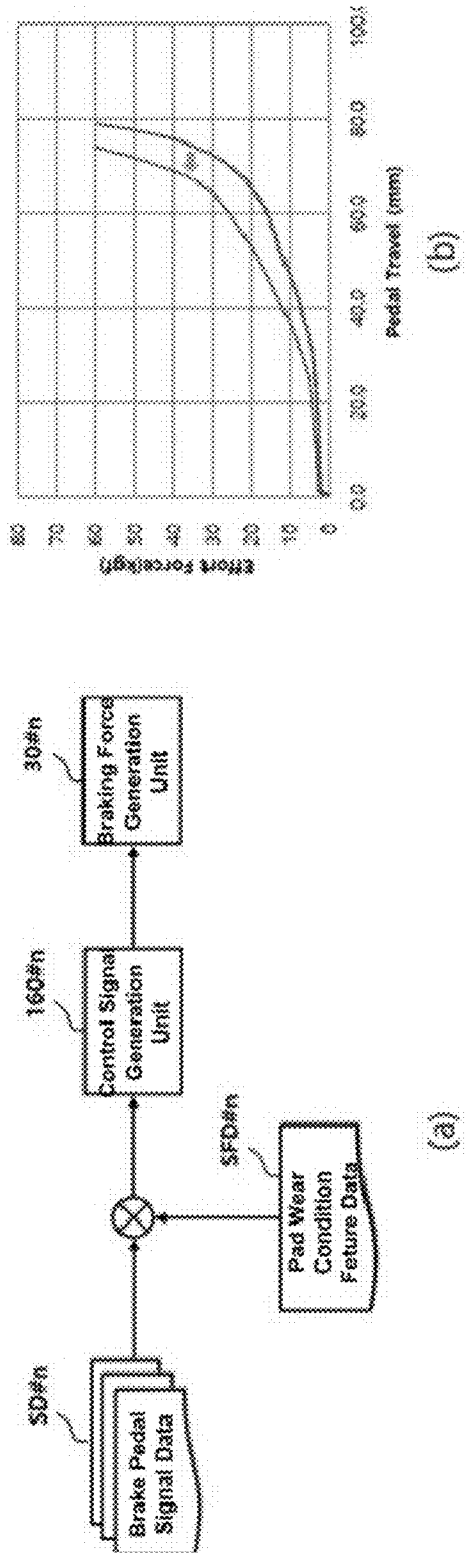
FIG. 8 is a view for illustrating a method of correcting and controlling a brake based on results of a diagnosis of the condition of a vehicle according to certain embodiments of the present disclosure.

FIG. 8 is a view for illustrating a method of correcting and controlling a brake based on results of a diagnosis of the condition of a vehicle according to certain embodiments of the present disclosure.

Referring to FIG. 8, a vehicle's braking system to which an electronic brake system such as IDB (integrated dynamic brake), EMB (electromechanical brake), EHB (electro-hydraulic brake), or a hybrid EMB is applied may generate a braking force based on brake pedal signal data (e.g., pedal stroke).

In this case, a control signal generation unit 160 #n of the present disclosure may generate and transmit a control signal to a braking force generation unit 30 #n to generate a different braking force depending on the condition of the brake system (typically, the pad wear condition) even if the same brake pedal signal data SD #n is inputted. Thus, consistent braking performance can be achieved despite a degradation in the condition of a brake consumable.

To this end, the control signal generation unit 160 #n may adjust the gain of a braking force for a brake pedal signal based on the values of brake pad condition feature data SFD #n. For example, a look-up table for brake pedal signal and brake pressure may be altered, or mapping values in the look-up table may be altered.

Although not shown, the control signal generation unit 160 #n may additionally transmit a control signal to the vehicle's collision warning system to advance the timing for a collision warning issued by this system to prevent an accident caused by a decrease in braking force.

Figure 9:
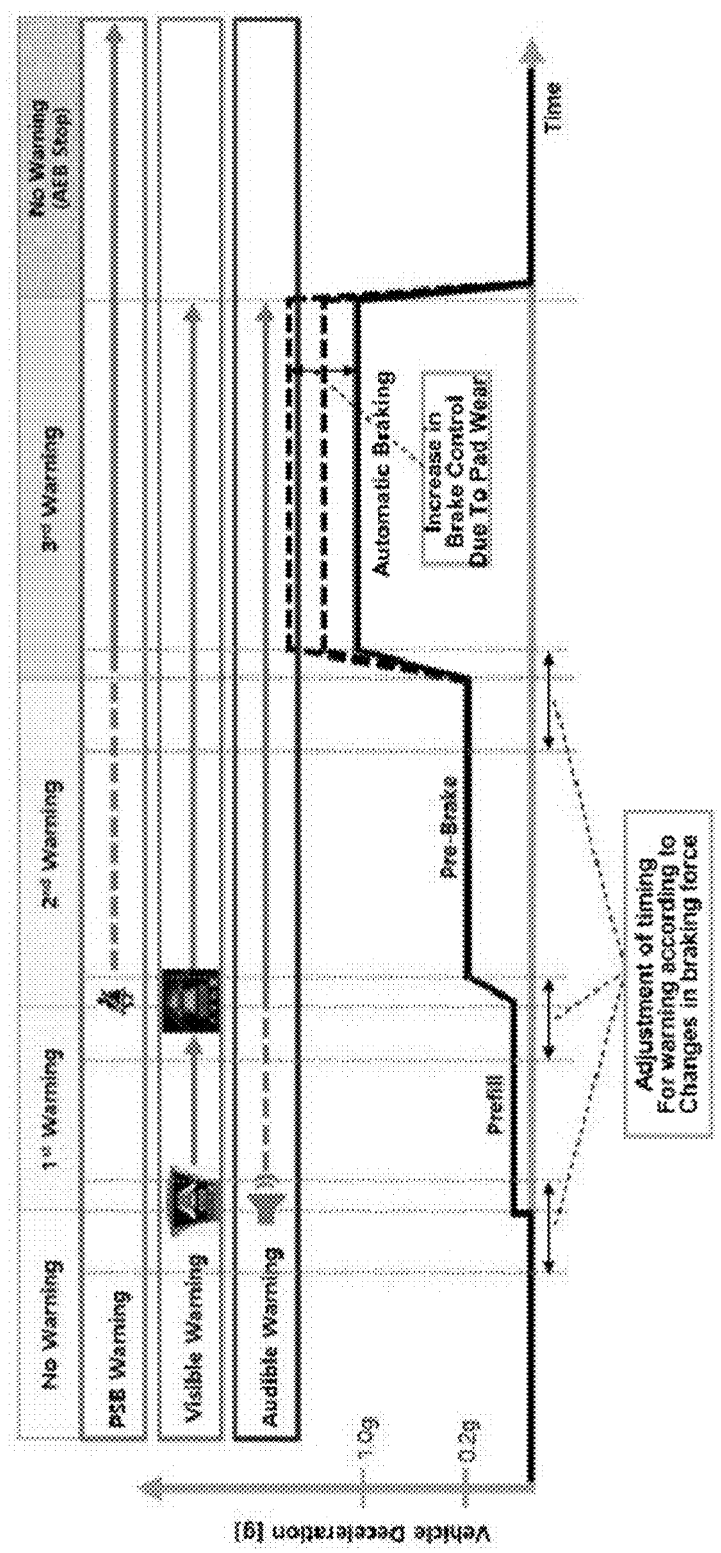
FIG. 9 is a view for illustrating a method of correcting and controlling an ADAS system based on results of a diagnosis of the condition of a vehicle according to certain embodiments of the present disclosure.

FIG. 9 is a view for illustrating a method of correcting and controlling an ADAS system based on results of a diagnosis of the condition of a vehicle according to certain embodiments of the present disclosure.

Similarly to what has been described with reference to FIG. 8, the control signal generation unit may generate and transmit various control signals to the ADAS DCU 40 to control the operation of the ADAS system according to the condition of the brake system (e.g., the pad wear condition).

As a concrete example, the control signal generation unit may transmit control signals to the ADAS DCU 40 to control the timing for giving the driver various warnings about a situation where braking is required, control the timing for initiating automatic braking, pre-fill, and pre-braking, and/or increase the amount of control. The above-mentioned various warnings may include, for example, a visible warning via a display such as a dashboard, an audible warning, and/or a PSB (pre-active seat belt).

The technical concept of the present disclosure is not necessarily limited to these embodiments, as all the elements configuring the embodiments of the present disclosure have been described as being combined or operated in combination. That is, within the scope of the present disclosure, all of the elements may be selectively operable in combination with one or more thereof.

Although operations are shown in a specific order in the drawings, it should not be understood that desired results can be obtained only when the operations are performed in the specific order or sequential order or when all of the operations are be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to embodiments thereof, it will be understood by those skilled in the art that various changes in form and detail may be made therein without departing from the spirit and scope of the present disclosure as defined by the following claims. Therefore, it is to be understood that the above-described embodiments are for illustrative purposes only, and the scope of the present disclosure is not limited thereto. The protection range of the present disclosure should be construed by the claims below, and all technical ideas within an equivalent range thereof should be construed as being included within the scope of the present disclosure.

What is claimed is:

1. A vehicle health monitoring (VHM) device embedded in a vehicle, the VHM device comprising:

an interface configured to collect a plurality of pieces of raw data sensed from a data collection unit in the vehicle and to perform data transmission and reception to and from electric control units (ECUs) or a domain control unit (DCU);

a data selection unit configured to select sensing data required to diagnose the condition of a particular device or particular component of the vehicle from among the collected raw data;

a feature data generation unit configured to generate at least one piece of feature data having new features by linearly or nonlinearly combining the selected sensing data through a feature extraction algorithm;

a condition feature data derivation unit configured to derive condition feature data for the particular device or particular component by inputting the selected sensing data and the at least one piece of generated feature data into a machine learning-based condition diagnosis model; and a control signal generation unit configured to generate a control signal for the particular device or particular component based on the condition feature data.

2. The VHM device of claim 1, further comprising a condition diagnosis model training unit configured to construct the condition diagnosis model by performing machine learning of a learning data set including at least either the selected sensing data, the at least one piece of generated feature data, or the feature characteristic data.

3. The VHM device of claim 2, wherein the condition feature data derivation unit is configured to derive the condition feature data based on sensing data weights assigned to respective pieces of the sensing data and feature data weights assigned to the at least one piece of feature data, and wherein the feature data weights have a higher weight value than the sensing data weights.

4. The VHM device of claim 2, further comprising a feature data management unit which configures a condition feature data set by hierarchically structuring the condition feature data for each of a plurality of devices or components including the particular device or component.

5. The VHM device of claim 4, wherein the condition feature data set includes:

a first condition feature layer including the vehicle's chassis condition feature data, power condition feature data, and ADAS (advanced driver assistance systems) condition feature data;

a second condition feature layer including braking condition feature data, steering condition feature data, and suspension condition feature data, which is configured as lower-level data of the chassis condition feature data; and a third condition feature layer including brake pad condition feature data, which is configured as lower-level data of the braking condition feature data.

6. The VHM device of claim 5, wherein the first condition feature data contained in the first condition feature layer is derived by additionally learning at least one piece of such data as the second condition feature data contained in the second condition feature layer and the third condition feature data contained in the third condition feature layer, and the second condition feature data is derived by additionally learning at least one piece of such data as the third condition feature data.

7. The VHM device of claim 5, wherein, if the particular device or component is a brake pad, the selected sensing data includes brake pedal stroke data, vehicle deceleration data, master cylinder pressure data, tire pressure data, and weather data, the feature data includes brake pedal stroke-deceleration ratio data, and the condition feature data includes brake pad wear condition feature data, and wherein the condition feature data derivation unit is configured to derive the brake pad wear condition feature data by assigning the highest weight value to the brake pedal stroke-deceleration ratio feature data based on road friction coefficient data estimated from the weather data.

8. The VHM device of claim 7, wherein the control signal generation unit is configured to adjust the gain of a braking force generated in response to the brake pedal stroke data based on the brake pad wear condition feature data.

9. The VHM device of claim 7, wherein the control signal generation unit is configured to adjust the timing for issuing a collision warning or the timing for entering an emergency braking mode based on the brake pad wear condition feature data.

10. A vehicle condition diagnosis control system comprising:

a health monitoring (VHM) device embedded in a vehicle and configured to manage condition feature data for each device or each component by diagnosing the conditions of individual devices or components of the vehicle;

a data collection unit configured to collect sensing data from the devices or components and to transmit the same to the VHM device; and a VHM cloud configured to cumulatively collect the sensing data and the condition feature data for each device or each component by performing periodical or non-periodical communication with the VHM device, wherein the VHM device includes:

a data selection unit configured to select sensing data required to generate condition feature data for each device or component from among the collected sensing data;

a feature data generation unit configured to generate at least one piece of feature data having new features by linearly or nonlinearly combining the selected sensing data through a feature extraction algorithm;

a condition feature data derivation unit configured to derive condition feature data for each device or component by inputting the selected sensing data and the at least one piece of generated feature data into a machine learning-based condition diagnosis model; and a control signal generation unit configured to generate a control signal for each device or component based on the condition feature data for each device or component.

11. The vehicle condition diagnosis control system of claim 10, wherein the VHM cloud includes:

a life prediction unit configured to derive life prediction data for each of the devices and components of the vehicle by inputting the cumulatively collected sensing data and the condition feature data for each device or component into a deep learning-based life prediction model; and a complex condition feature data generation unit configured to generate the vehicle's complex condition feature data dependent upon the conditions of two or more devices or components by inputting the sensing data and the condition feature data for each device or component into a deep learning-based complex condition diagnosis model.

12. The vehicle condition diagnosis control system of claim 11, wherein the condition feature data derivation unit of the VHM device is configured to derive condition feature data for each device or component by inputting instantaneous values of the sensing data and instantaneous values of the at least one piece of feature data into the condition diagnosis model, and wherein the life prediction unit and complex condition feature data generation unit of the VHM cloud are configured to derive the life prediction data and the complex condition feature data by inputting the sensing data accumulated in time series and the condition feature data for each device or component accumulated in time series into the life prediction model and the complex condition diagnosis model.

13. The vehicle condition diagnosis control system of claim 11, wherein, if the condition feature data for each device or component is out of a reference range, the VHM device periodically or non-periodically is configured to send the sensing data, the at least one piece of feature data, and the condition feature data for each device or component to the VHM cloud, and wherein the VHM cloud is configured to generate a learning guidance data for training the condition diagnosis model through guidance based on the collected sensing data, the at least one piece of feature data, or the condition feature data for each device or component and then sends the same to the VHM device.

14. The vehicle condition diagnosis control system of claim 11, wherein the VHM cloud is configured to generate a vehicle management report based on the life prediction data and the complex condition feature data and then to send the same to the VHM device.

* * * * *